Sept. 3, 1968   A. WINKLER ET AL   3,399,842
MOTION PICTURE PROJECTOR

Filed Aug. 30, 1966   2 Sheets-Sheet 1

INVENTORS
ALFRED WINKLER
KARL BAMMESBERGER
HEINZ KRÖBEL
HERBERT WILSCH
BY Michael J. Striker

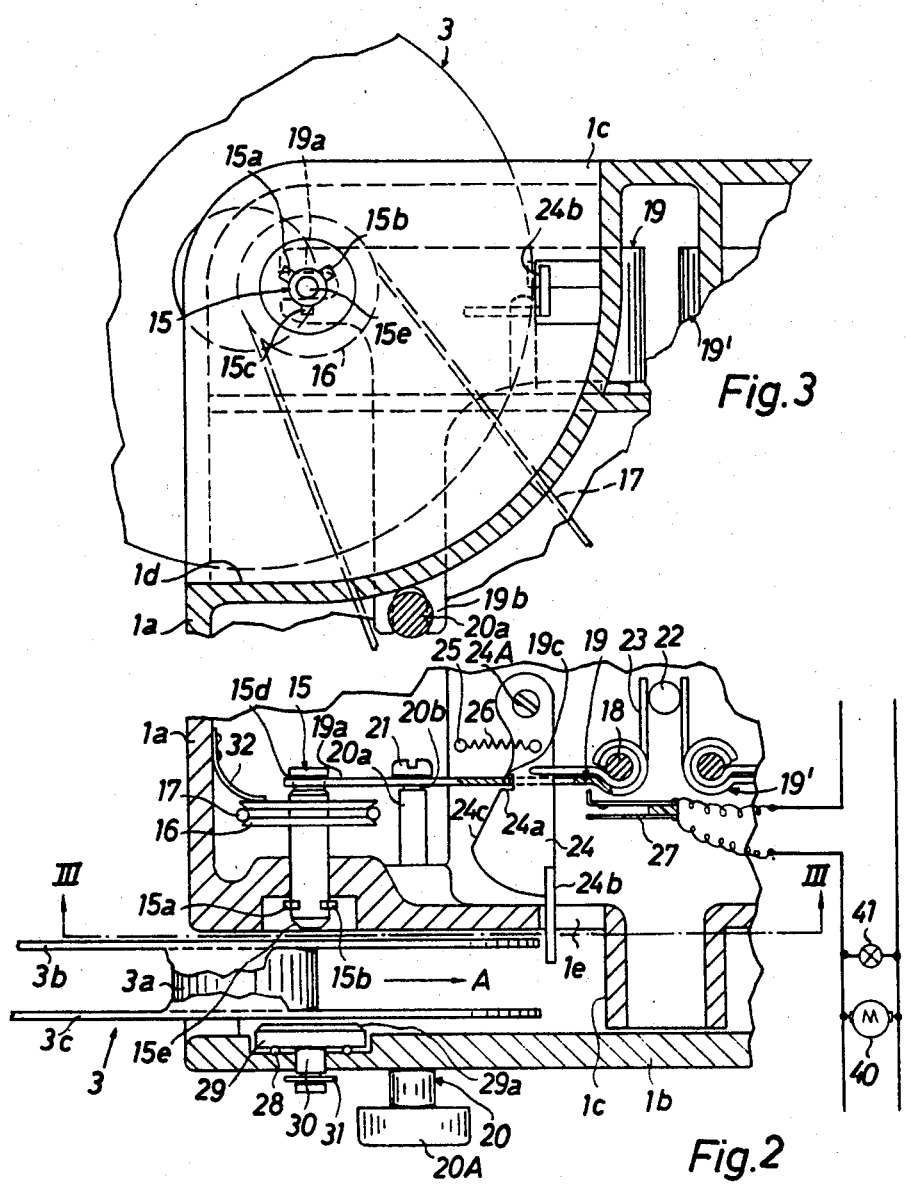

United States Patent Office 3,399,842
Patented Sept. 3, 1968

3,399,842
MOTION PICTURE PROJECTOR
Alfred Winkler, Munich, Karl Bammesberger, Munich-Untermenzing, and Heinz Krobel and Herbert Wilsch, Munich, Germany, assignors to Agfa-Gevaert Aktiengesellschaft, Leverkusen, Germany
Filed Aug. 30, 1966, Ser. No. 575,994
Claims priority, application Germany, Sept. 30, 1965, A 50,376
23 Claims. (Cl. 242—55.11)

ABSTRACT OF THE DISCLOSURE

The housing of a motion picture projector has an open-sided recess which can receive a portion of a reel. A rotary spindle is reciprocable in the housing between a retracted position and an extended position in which its conical tip enters the central opening in the core of a reel which is introduced into the recess. The projector has actuating means for reciprocating the spindle and the recess accommodates guides which maintain the reel in such position that the opening of its core is at least substantially aligned with the spindle when the latter is held in retracted position.

---

The present invention relates to motion picture projectors in general, and more particularly to improvements in the mounting of reels on the housing of a motion picture projector.

In many presently known motion picture projectors, the supply reel and the takeup reel must be slipped onto customary spindles and a properly attached reel is then held against axial movement by a small lever which is provided at the free end of the respective spindle and is movable between an axial position in which it permits attachment or removal of the reel and a radial position in which the reel is held against uncontrolled separation. Such manipulation is time-consuming and the operator cannot immediately locate the levers when the reels must be attached or detached in a darkened room.

Accordingly, it is an important object of the present invention to provide a motion picture projector with novel and improved means for facilitating rapid, accurate and effortless attachment or detachment of a takeup and/or supply reel from the respective spindle.

Another object of the invention is to provide a motion picture projector of the just outlined characteristics wherein the reels may be attached or detached in complete darkness.

A further object of the invention is to provide a motion picture projector wherein, even when manipulated in darkness, the reels are actually guided to requisite positions with reference to the spindles.

An additional object of the invention is to provide a moton picture projector wherein the reels may be at least partially ejected in automatic response to separation of such reels from the respective spindles.

A concomitant object of the invention is to provide a novel mounting for the reel-supporting and driving spindles of a motion picture projector.

An additional object of our invention is to provide a motion picture projector wherein the reel-supporting spindles are fully concealed in the projector housing and wherein the spindles can support the reels in such a way that the reels cannot rub against the housing so that the wear upon the parts of the projector is negligible and that the projection of images onto a screen is not accompanied by noise.

A further object of the instant invention is to provide a motion picture projector wherein the disengagement of a reel from the respective spindle automatically results in disengagement of the drive for such spindle.

Another object of the invention is to provide a motion picture projector wherein the detachment of a reel from the associated spindle automatically opens the circuit of the projection lamp.

Briefly stated, one feature of the present invention resides in the provision of a movie projector or motion picture projector which comprises a housing defining at least one open-sided recess adapted to accommodate at least a portion of a reel whose core is provided with a centrally located opening, a rotary spindle mounted in the housing and reciprocable between a retracted position and a second or extended position in which a portion of such spindle extends into the recess to enter the opening in the core of a reel which was introduced into the recess while the spindle was held in retracted position, and actuating means for moving the spindle between retracted and second positions. Such actuating means may comprise a spring which permanently biases the spindle to second position and a manually operable actuating member which can move the spindle to retracted position. The projector may further comprise locking means for releasably holding the spindle in retracted position and guide means provided on such locking means for moving the latter to an unlocking position in response to engagement by the reel when the opening in the latter's core is in at least substantial registry with the spindle.

The recess is preferably located in a vertical plane which makes right angles with the axis of the spindle and is normally provided in a corner portion of the upper part of the projector housing. Another corner portion of the upper part of the housing is preferably provided with a second recess which can accommodate a second reel, and the projector then comprises a second reciprocable spindle for such second reel as well as actuating means for moving the second spindle between retracted and extended positions.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of a specific embodiment with reference to the accompanying drawings, in which:

FIG. 2 is an enlarged fragmentary horizontal section as seen in the direction of arrows from the line II—II of FIG. 1; and FIG. 3 is a fragmentary section as seen in the direction of arrows from the line III—III of FIG. 2.

Figure 1:
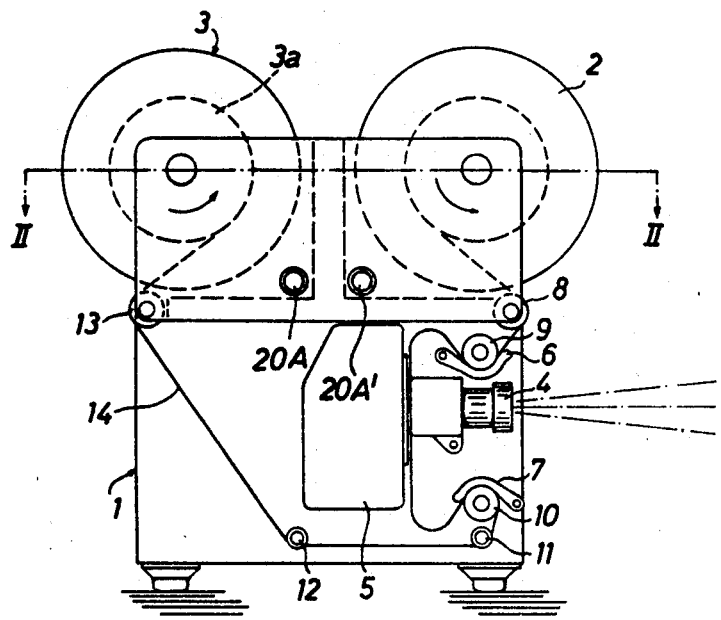
FIG. 1 is a side elevational view of a motion picture projector which embodies our invention.

Referring first to FIG. 1, there is shown a motion picture projector which comprises a housing 1 having an upper portion supporting a supply reel or spool 2 and a takeup reel or spool 3. This housing 1 further carries a projection lens 4 located in front of a lamp casing 5 and between an upper loop former 6 and a lower loop former 7. Guide rolls 8 to 13 are provided on the housing 1 to guide the film 14 along a predetermined path a portion of which extends between the lens 4 and lamp casing 5.

The novel mounting for the reels 2 and 3 is illustrated in FIGS. 2 and 3. These figures merely show the manner in which the takeup reel 3 is mounted in the housing 1 because the mounting of the supply reel 2 in the right-hand corner of the upper part of this housing is analogous. The housing comprises a hollow frame 1a and a side wall or cover 1b. The upper left-hand corner portion of the frame 1a is formed with a substantially sector-shaped cutout whose front side is closed by the cover 1b so that the parts 1a, 1b define between themselves a recess 1c best shown in FIG. 2 and having its deepmost zone bounded by a concave surface 1d of the frame 1a. The upper side and the left-hand side of this recess 1c are open and the depth of this recess exceeds the radius of the takeup reel 3.

The frame 1a supports a horizontal spindle 15 for the core 3a of the reel 3, and this spindle is movable axially to and from the retracted position shown in FIG. 3 in a direction at right angles to the plane of the recess 1c. That portion of the spindle 15 which is accommodated in the interior of the frame 1a is connected with a sheave 16 driven by an endless belt or cord 17. The latter is also trained around a second sheave (not shown) which is driven by the motor 40 of the projector. The outer end portion of the spindle 15 is provided with coupling pins 15a, 15b, 15c each of which can enter a customary slot provided in the core 3a of the takeup reel 3 when the latter is properly attached to the spindle.

The means for moving the spindle 3 axially comprises an actuating lever 19 which is rockable about the axis of a vertical pivot pin 18. This lever comprises a first forked end portion 19a whose prongs extend into a circumferential groove 15d of the spindle 15. The prongs of a second forked end portion 19b of the lever 19 extend into a circumferential groove 20b provided at the inner end of a reciprocable actuating member 20 which resembles a pushbutton and whose knob 20A is located in front of the side wall 1b. The stem 20a of the actuating member 20 carries at its inner end a screw 21 which defines therewith the aforementioned groove 20b.

The lever 19 is biased by an actuating spring 23, here shown as a torsion spring, which is convoluted around the pivot pin 18. One terminal of this actuating spring bears against a fixed stop pin 22 and its other terminal bears against the lever 19 so that the latter tends to turn in a counterclockwise direction, as viewed in FIG. 3. Such movement of the lever 19 will cause the spindle 15 to penetrate into the recess 1c and to assume an extended position. The spindle 15 can be locked in retracted position by a locking lever 24 which is rockable about a vertical pivot pin 24A and has a notch 24a which can receive a suitably configurated projection or lug 19c of the actuating lever 19. The locking lever 24 is biased by a helical spring 26 which tends to maintain the notch 24a in the position shown in FIG. 3. One end of this spring 26 is attached to a fixed post 25.

The locking lever 24 is further provided with an extension or guide means 24b which extends through a cutout 1e of the frame 1a and into the recess 1c. The position of the extension 24b is selected in such a way that this extension is engaged by at least one of the flanges 3b, 3c of the takeup reel 3 shortly before the central opening in the latter's core 3a registers with the sprindle 15, i.e., while the reel is being moved in the direction indicated in FIG. 3 by an arrow A. The flange 3b then rocks the locking lever 24 against the opposition of the spring 26 so that the notch 24a moves away from the lug 19c and the actuating spring 23 is free to rock the actuating lever 19 in a counterclockwise direction to push the spindle 15 into the core 3a. Minor inaccuracies in registry of the core 3a with the spindle 15 are compensated for by conical configuration of the foremost end or tip 15e of the spindle. The internal surface 1d in the recess 1c also serves as a guide and facilitates placing of the reel 3 into registry with the spindle 15. Thus, as and a shown in FIG. 2, if the operator inserts a portion of the reel 3 into the recess 1c so that the flanges 3b, 3c rest on the surface 1d, and if the operator thereupon pushes the reel deeper into the recess 1c, the flange 3b will engage and rock the extension 24b to release the lever 19 at the time when the opening in the core 3a registers with the spindle 15.

When the notch 24a moves away from the lug 19c, the latter travels along a cam face 24c of the locking lever 24 and moves the extension 24b further away from the flanges 3b, 3c. When the spindle 15 penetrates into the opening of the core 3a, its conical tip 15e actually lifts the flanges 3b, 3c off the surface 1d so that the reel 3 is then supported solely by the spindle 15 and cannot rub against the frame 1a and/or side wall 1b. It is clear that the recess 1c may accommodate a second lever, similar to the lever 24 and having a second extension which can guide at least one of the flanges 3b, 3c from below so that these flanges need not come in actual contact with the surface 1d. Such second extension can move away from the flanges, 3b, 3c in response to penetration of the spindle 15 into the core 3a so that the takeup reel 3 is free to rotate with the spindle without being frictionally engaged by any such parts which guide its core 3a into registry with the spindle. As stated before, the lug 19c will engage the cam face 24c and will maintain the extension 24b out of contact with the reel 3 as soon as the latter is properly supported by the spindle 15. Of course, the cam face 24c can be tracked by a separate follower of the lever 19, i.e., not necessarily by the lug 19c. The configuration of the cam face 24c will determine the distance between the flanges 3b, 3c and the extension 24b when the reel 3 is properly supported by the spindle 15.

The side wall 1b accommodates a disk-shaped back support 29 which is rotatable on the balls 28 or analogous friction-reducing elements of a thrust bearing and is located directly opposite the tip 15e of the spindle 15. The shaft 30 of the back support 29 is rotatable in the side wall 1b and is held against excessive axial movement by a split ring 31 or by another suitable retainer. The inner side of the back support 29 is provided with a conical marginal face 29a to facilitate introduction of the reel 3 into the recess 1c. The flange 3c bears against and rotates the back support 29 when the reel 3 is driven by the spindle 15.

In order to remove a properly supported reel 3, the operator simply depresses the knob 20A of the actuating member 20 so that the stem 20a rocks the actuating lever 19 in a clockwise direction, as viewed in FIG. 3, whereby the forked portion 19a moves the spindle 15 axially into the interior of the frame 1a until the tip 15e is fully withdrawn from the core 3a. The flanges 3b, 3c of the reel 3 descend onto the surface 1d and the spring 26 is free to contract so that the locking lever 24 engages and holds the actuating lever 19 in the position shown in FIG. 3. At the same time, the spring 26 causes the extension 24b to shove the flanges 3b, 3c in a direction to the left, as viewed in FIG. 3, so that the lever 24 also acts not unlike an ejector to at least start the expulsion of the reel 3 from the recess 1c. At the very least, the extension 24b can bring about such displacement of the reel 3 that the latter can be more readily grasped by fingers for convenient withdrawal from the recess 1c.

The actuating lever 19 can serve as a trip for a normally open master switch 27 which is connected in the circuit of the projector motor 40 and projection lamp 41 so that this circuit is opened in automatic response to depression of the knob 20A. Thus, the motor 40 is arrested and the lamp 41 is turned off as soon as the reel 3 is disconnected from the spindle 15. If desired, the master switch 27 may be connected only in the circuit of the motor 40 or only in the circuit of the lamp 41.

The manner in which the supply reel 2 is mounted in a recess provided in the upper right-hand corner portion of the housing 1 is analogous to the manner of mounting the reel 3. FIG. 1 merely shows the knob 20A' of the actuating member for the spindle of the reel 2 and FIGS. 2 and 3 show a portion of a second actuating lever 19'.

FIG. 2 further shows a leaf spring 32 which is mounted in the frame 1a and bears against the sheave 16 to brake the spindle 15 during rewinding, i.e., when the movie film 14 is being collected on the supply reel 2. This spring 32 constitutes an optional feature of the projector because the latter may be provided with other known means to control the speed of the film during rewinding.

Without further analysis, the foregoing will so fully reveal the gist of the present invention that others can, by applying current knowledge, readily adapt it for various applications without omitting features which fairly constitute essential characteristics of the generic and specific aspects of our contributions to the art and, therefore, such adaptations should and are intended to be comprehended within the meaning and range of equivalence of the following claims.

What is claimed as new and desired to be protected by Letters Patent is:

1. In a motion picture projector, a housing defining at least one open-sided recess adapted to accommodate at least a portion of a reel whose core is provided with a centrally located opening; a rotary spindle mounted in said housing and reciprocable between a retracted position and a second position in which a portion thereof extends into said recess to enter the opening in the core of a reel which is introduced into said recess while the spindle is being held in retracted position; actuating means for moving said spindle between retracted and second positions; and guide means provided in said recess for guiding the reel which is introduced into said recess to a position of at least substantial registry of the opening in the core of such reel with said spindle.

2. A structure as set forth in claim 1, wherein said portion of the spindle comprises a conical tip to facilitate its introduction into the opening of a core.

3. A structure as set forth in claim 1, wherein said guide means comprises a portion of said housing which bounds part of said recess.

4. A structure as set forth in claim 1, further comprising drive means for rotating said spindle.

5. A structure as set forth in claim 1, wherein said portion of the spindle comprises coupling means arranged to engage complementary coupling means on the core of the reel which is supported by said spindle.

6. A structure as set forth in claim 1, further comprising locking means for releasably holding said spindle in retracted position.

7. A structure as set forth in claim 1, further comprising a back support for the reel in said recess, said back support being provided in said housing opposite said portion of the spindle.

8. A structure as set forth in claim 1, wherein said actuating means comprises a manually operable actuating member reciprocally mounted in said housing and operatively connected with said spindle to move such spindle to one of said positions.

9. A structure as set forth in claim 1, wherein said recess is located in a plane which makes right angles with the axis of said spindle.

10. In a motion picture projector, a housing defining at least one open-sided recess adapted to accommodate at least a portion of a reel whose core is provided with a centrally located opening; a rotary spindle mounted in said housing and reciprocable between a retracted position and a second position in which a portion thereof extends into said recess to enter the opening in the core of a reel which is introduced into said recess while the spindle is being held in retracted position; and actuating means for moving said spindle between retracted and second positions; and means for braking said spindle.

11. In a motion picture projector, a housing defining at least one open-sided recess adapted to accommodate at least a portion of a reel whose core is provided with a centrally located opening; a rotary spindle mounted in said housing and reciprocable between a retracted position and a second position in which a portion thereof extends into said recess to enter the opening in the core of a reel which is introduced into said recess while the spindle is being held in retracted position; and actuating means for movng said spindle between retracted and second positions, said actuating means comprising locking means for releasably holding said spindle in retracted position.

12. In a motion picture projector, a housing defining at least one open-sided recess adapted to accommodate at least a portion of a reel whose core is provided with a centrally located opening; a rotary spindle mounted in said housing and reciprocable between a retracted position and a second position in which a portion thereof extends into said recess to enter the opening in the core of a reel which is introduced into said recess while the spindle is being held in retracted position; actuating means for moving said spindle between retracted and second positions; and locking means for releasably holding said spindle in retracted position, comprising guide means for guiding the reel which is introduced into said recess to a position of at least substantial registry of the opening in the core of such reel with said spindle.

13. A structure as set forth in claim 12, wherein said locking means is movable between locking and unlocking positions and wherein said guide means is arranged to move said locking means to unlocking position in response to engagement by a reel whose opening is in a position of at least substantial registry with said spindle.

14. A structure as set forth in claim 13, further comprising means for biasing said locking means to locking position.

15. A structure as set forth in claim 12, wherein said actuating means comprises means for moving said guide means away from the reel in said recess when the spindle is moved to said second position.

16. A structure as set forth in claim 15, wherein the means for moving said guide means away from the reel comprises a cam face provided on said locking means and follower means engaging said cam face and provided on said actuating means to transmit motion to said locking means and to said guide means in response to movement of said spindle to second position.

17. In a motion picture protector, a housing defining at least one open-sided recess adapted to accommodate at least a portion of a reel whose core is provided with a centrally located opening; a rotary spindle mounted in said housing and reciprocable between a retracted position and a second position in which a portion thereof extends into said recess to enter the opening in the core of a reel which is introduced into said recess while the spindle is being held in retracted position; actuating means for moving said spindle between retracted and second positions; and a back support for the reel in said recess, said back support being provided in said housing opposite said portion of the spindle and comprising a rotary member mounted in said housing and friction reducing means interposed between said housing and said rotary member.

18. A structure as set forth in claim 17, wherein said friction reducing means comprises a thrust bearing.

19. In a motion picture projector, a housing defining at least one open-sided recess adapted to accommodate at least a portion of a reel whose core is provided with a centrally located opening; a rotary spindle mounted in said housing and reciprocable between a retracted position and a second position in which a portion thereof extends into said recess to enter the opening in the core of a reel which is introduced into said recess while the spindle is being held in retracted position; actuating means for moving said spindle between retracted and second positions; and an electric circuit including an electric motor arranged to drive said spindle and switch means connected in said circuit, said actuating means comprising means for effecting opening of said switch means in response to movement of said spindle to retracted position.

20. In a motion picture projector, a housing defining at least one open-sided recess adapted to accommodate at least a portion of a reel whose core is provided with a centrally located opening; a rotary spindle mounted in said housing and reciprocable between a retracted position and a second position in which a portion thereof extends into said recess to enter the opening in the core of a reel which is introduced into said recess while the spindle is being held in retracted position; and actuating means for moving said spindle between retracted and second positions; a projection lamp; and switch means connected in series with said lamp, said actuating means comprising means for effecting opening of said switch means in response to movement of said spindle to retracted position.

21. In a motion picture projector, a housing comprising an upper part having a corner portion provided with at least one recess adapted to accommodate at least a portion of a reel whose core is provided with a centrally located opening, said recess having two open sides; a rotary spindle mounted in said housing and reciprocable between a retracted position and a second position in which a portion thereof extends into said recess to enter the opening in the core of a reel which was introduced into said recess while the spindle was held in retracted position; and actuating means for moving said spindle between retracted and second position.

22. A structure as set forth in claim 21, wherein said upper part of the housing comprises a second corner portion provided with a second recess arranged to accommodate a second reel, and further comprising a second reciprocable spindle extendable into said second recess and second actuating means for said second spindle.

23. In a motion picture projector, a housing defining at least one open-sided recess adapted to accommodate at least a portion of a reel whose core is provided with a centrally located opening; a rotary spindle mounted in said housing and reciprocable between a retracted position and a second position in which a portion thereof extends into said recess to enter the opening in the core of a reel which is introduced into said recess while the spindle is being held in retracted position; actuating means for moving said spindle between retracted and second positions; and means for at least partially ejecting a reel from said recess in response to movement of said spindle to retracted position.

References Cited
UNITED STATES PATENTS

| | | | |
|---|---|---|---|
| 2,466,124 | 4/1949 | Owens | 242—55.12 |
| 3,043,533 | 7/1962 | Faulkner et al. | 242—55.13 X |

LEONARD D. CHRISTIAN, *Primary Examiner.*